United States Patent Office 3,454,488
Patented July 8, 1969

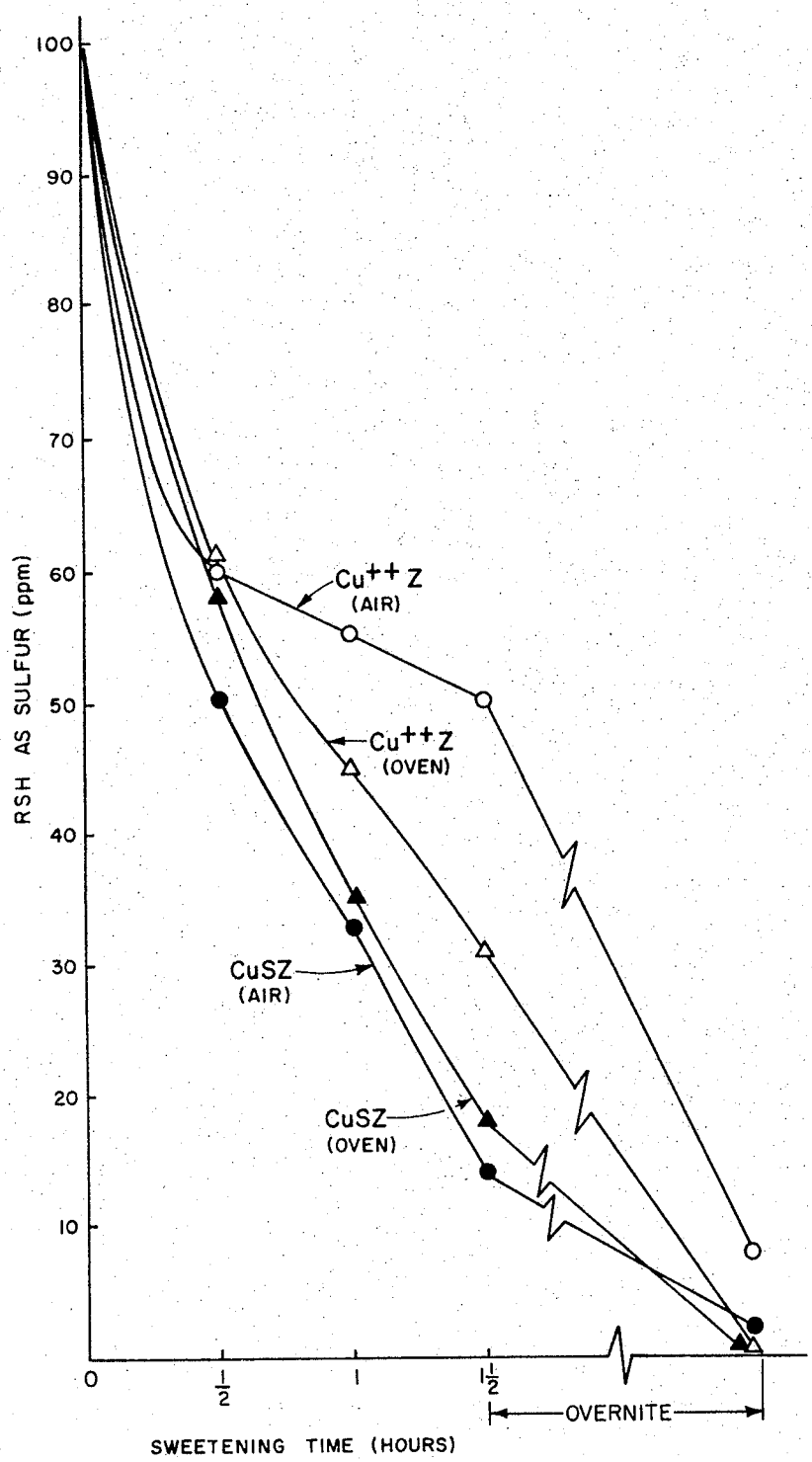

3,454,488
SWEETENING PROCESS UTILIZING ION EXCHANGE COMPOSITIONS
William R. Lewis and Wilmer L. Bird, Baton Rouge, La., and Morris Mindick, Tyler, Tex., assignors of one-half interest each to Esso Research and Engineering Company, a corporation of Delaware, and Howe-Bakers Engineers, Inc., a corporation of Texas
Filed Sept. 27, 1967, Ser. No. 670,966
Int. Cl. C10g 29/10, 27/04
U.S. Cl. 208—191
10 Claims

ABSTRACT OF THE DISCLOSURE

A process for sweetening sour petroleum hydrocarbon feedstocks utilizes particulate ion exchange compositions which contain ionically bound metal and which are treated in accordance with the invention to convert the ionic metal to a nonionic form. The ionically bound metal is converted to the sulfide, oxide, hydroxide or elemental form of the metal to provide a more active sweetening catalyst.

---

This invention relates to the catalytic sweetening of hydrocarbons such as sour petroleum distillate fractions. More particularly, the invention relates to an improved process for catalytically converting mercaptan sulfur contaminants in petroleum fractions to the corresponding disulfide compounds which are relatively inactive. The sweetened petroleum fractions are suitable for use as components in various fuel fractions such as motor fuel, jet fuel, diesel fuel, kerosene, heating oil, etc. Specifically, the present process entails contacting a liquid petroleum fraction containing a substantial amount of mercaptans, i.e., a sour fraction with a sweetening catalyst comprising a metal or a metal salt widely dispersed on a base comprising an ion exchange composition. The sweetening process of the invention is carried out at mild conditions of temperature and pressure in the presence of air.

The sweetening of petroleum fractions is a well known refinery process and it is practiced world-wide. Sulfur compounds such as mercaptans are detrimental to the performance of fuels due to their corrosiveness and odor and also due to their tendency to reduce the lead susceptibility of certain fuels such as gasoline. By the same token, the presence of sulfur compounds is undesirable in the petroleum feedstocks for various catalytic conversion processes because the sulfur in sour fractions tends to poison catalyst and to cause corrosion of the processing units.

Sweetening has been carried out in the past using chemical agents such as sodium plumbite, copper sulfate, alkaline sodium hypochloride, and many other materials. The active agent is sometimes supported on a carrier. In many cases chemical sweetening must be carried out in the presence of caustic which causes corrosion and which presents the requirement of disposing of the caustic. Sweetening has also been carried out with the use of adsorbents, including molecular sieve adsorbents. Adsorptive processes suffer from the disadvantage that throughput in adsorption units is limited. When the adsorbent bed has taken up a certain quantity of mercaptan it is necessary to regenerate the bed.

It is the object of this invention to provide a sweetening process which is characterized by a catalytic reaction enabling high throughputs of the sour petroleum fraction through the catalytic bed. Another object of the invention is to contact the sour feedstock with a catalytic material which is widely dispersed on a support material.

Briefly summarizing, the present invention is directed to a process for sweetening sour hydrocarbon compositions in which liquid hydrocarbons and an oxygen containing gas are brought into intimate contact with a bed of finely divided particulate solid ion exchange composition having a metal or a metal salt widely dispersed thereon. The sweetening process is carried out at mild conditions so that the highly active catalyst does not convert any significant quantity of the hydrocarbon fraction. The reaction is ordinarily carried out to convert the sour feed to a sweet feed which will pass a standard test such as the doctor test for mercaptan sulfur. The mercaptan content of typical feeds can be reduced to less than 10 p.p.m. The sweetening catalyst of the present invention is prepared by modifying a recently developed sweetening catalyst.

Further details of the invention are set forth below. The drawing is a graph comparing sweetening runs with the catalyst of the invention and prior art catalysts.

It is known that sour hydrocarbon compositions can be sweetened when they are brought into intimate contact with a finely divided particulate solid ion exchange compostion which contains an ionically bound metal. Catalysts of this type are disclosed in Belgian Patent 688,096. The patent discloses sweetening catalysts comprising metal ions such as copper, mercury, silver, nickel, lead, cobalt, iron, zinc, platinum, and palladium ionically bound to inorganic aluminosilicates such as natural and synthetic amorphous zeolites as well as synthetic, organic, cation, and anion exchange materials. The preferred metal is copper and the preferred bases are amorphous synthetic zeolites of a formula $Na_2O \cdot Al_2O_3 \cdot 6SiO_2 \cdot xH_2O$ and macroporous sulfonic acid ion exchange resins. We have found that when the active metal is converted to the sulfide, the oxide, the hydroxide, or to elemental (zerovalent) metal form, the sweetening reaction proceeds at a faster rate and a greater conversion of the mercaptans is obtained.

There are two principal sweetening reactions involved when an ionic metal such as $Cu^{++}$ is employed. They are:

(1) Regenerative

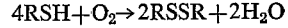
$$4RSH + O_2 \rightarrow 2RSSR + 2H_2O$$

(2) Stoichiometric

$$4RSH + 2Cu^{++} \rightarrow 2CuSR + RSSR + 4H^+$$

The formation of copper mercaptide in the second reaction can be minimized by continuous regeneration with air, however it would be more desirable to eliminate it by the use of copper in a nonionic form, i.e., as a true catalyst. The difficulty with most catalytic sweetening reactions is that the catalyst is not sufficiently active to cause the sweetening reaction to go to completion at high space velocities through the reactor. We have found that greatly improved results can be obtained by sweetening sour petroleum feeds with the catalysts described below.

The catalyst is prepared by converting the prior art catalysts to the elemental metal, the sulfide, the oxide, or the hydroxide form. Suitable catalyst bases include synthetic, organic cation and anion exchangers and amorphous zeolites or crystalline aluminosilicate molecular sieves. The zeolites may be natural or synthetic. In general, the ion exchange resins and zeolites employed should have at least one square meter per gram and preferably at least three square meters per gram of surface area available to the hydrocarbon. A high base exchange capacity is essential.

Amorphous synthetic zeolites of a formula $$Na_2O \cdot Al_2O_3 \cdot 6SiO_2 \cdot xH_2O$$

are suitable bases. Amorphous synthetic zeolites are alumino-silicates of either the fusion or gel type. The fusion types are similar to natural zeolites and are prepared by fusing together mixtures of soda, potash, feldspar and kaolin. Gel type synthetic zeolites can be prepared for example by adding alkali in controlled proportions to acid solutions of aluminum sulfate and sodium silicate or by the reaction of sodium silicate with a variety of aluminum salts such as sodium aluminate. A typical amorphous material is Aridzone AAA, a commercially available material.

The crystalline alumino silicate zeolite molecular sieves utilized in the practice of the present invention are now well known in the art and are, in fact, commercially available. While the crystalline zeolites differ from each other in chemical composition, they may generally be characterized as alkali metals or alkaline earth metal hydrated aluminosilicates. Their crystalline powders are such that after dehydration they present structures containing a large number of pores having exceptional uniformity of size. The pores in different zeolites may vary in diameter from less than 4 Angstroms to 15 Angstroms or more; but for any particular one of these zeolites the pores are essentially of uniform size. Ordinarily both the amorphous and crystalline zeolites as found in nature or prepared synthetically contain primarily sodium as the metal cation. It is necessary to exchange the major portion of the sodium, i.e., to a final concentration of less than about 10 percent of the initial sodium, utilizing base exchange processes well known in the art. These exchange processes will generally consist of contacting the sodium form of the sieve with an aqueous solution of a metal salt, i.e., chloride, sulfate, nitrate, acetate, or other soluble salt forms until a total of about 50 to 90 wt. percent, preferably 75 to 90 wt. percent, of the original sodium or alkaline ion has been replaced by the desired metal.

Suitable metals include copper, mercury, silver, iron, nickel, cobalt, lead, zinc, platinum, palladium, and mixtures of these. Copper and lead are the preferred metals. Copper is the most preferred metal. In the case of crystalline molecular sieves, the most preferred bases are faujasite, mordenite, and eronite. The most preferred metal-base combination is copper base exchanged with faujasite. A cupric salt such as copper sulfate, copper nitrate, etc. is dissolved in a suitable solvent for exchange with the faujasite.

In addition to the inorganic base exchange metals described above, synthetic, organic, cation and anion exchangers can be used in the process. Among the cation exchangers are the phenol sulfonic and more particularly the sulfonated styrene base resins. The preparation of sulfonated styrene-divinyl benzene strong acid cation exchange resin is described in U.S. Patent 2,366,007. The sulfonic acid phenol formaldehyde resins are prepared by condensing a phenol sulfonic acid with formaldehyde. In general, resins having a plurality of sulfonic acid groups are useful in producing the compositions of the present invention. Weak acid cation exchange resins having carboxylic groups as the functional sites can also be used in the present invention. Strongly basic anion exchange resins are disclosed in U.S. Patents 2,591,573, 2,597,440, 2,597,494, 2,614,009, 2,630,427, 2,632,000, and 2,632,001. Weakly basic anion exchange resins of the amine type can also be employed in the invention. The commercially available product Dowex WBR is a material of this type. Chelate resins prepared by reacting a chloromethylated styrene-divinyl benzene copolymer with iminodiacetic acid can also be used. Organic ion exchange resins employed should have a macroporous or macroreticular, hard gel structure, provided with a plurality of sulfonic acid groups as the exchange sites. In the form used in the invention, sulfonic acid groups are in the metal $++$ form in which the metal $++$ ion is held onto sulfonic acid groups in the resins structure. Such resins may be prepared by procedures shown in British Patents 754,521 and 860,695. Similar disclosures are set forth in Canadian Patents 625,753 and 674,860 as well as German Patent 1,045,102 and U.S. Patent 3,021,288. Sulfonating procedures are disclosed by U.S. Patents 2,366,077 and 2,500,149. The ion exchange resins are base exchanged with the metals mentioned previously with respect to the zeolites in the same manner.

The prior art catalyst starting material can also be a complex of the metal zeolite or resin composition. These metal complexes are prepared by contacting the metal zeolite or resin with the complexing agent preferably dissolved in a solvent. In a preferred embodiment, ammonia or an amine dissolved in a solvent such as water or an organic medium is used as the complexing agent. Organic solvents that can be used in forming the complex include n-butanol, isopropanol, benzene, kerosene, naphtha, acetone, dimethyl sulfoxide, dimethyl formamide, carbon tetrachloride, methanol, ethanol, o-butyrolactone, and mixtures of any of the above such as benzene-isopropanol and benzene-methanol. In addition to ammonia, amines including primary, secondary and tertiary amines, diamines, polyamines, heterocyclic amines, and aromatic amines can be used in the process. Specific amines include methyl amine, ethyl amine, propyl amine, butyl amine, ethylene diamine, n-methyl-ethylenediamine, n-ethyl-ethylenediamine, propylene diamine, diethylene triamine, tetraethylene pentamine, pentaethylene hexamine, and aniline. Pyridine is considered a heterocyclic amine and can be used in carrying out the subject invention. In certain instances the amines are used alone, but in most cases the amines are dissolved in an organic solvent of the type described above. Aqueous solutions of amines or ammonia can also be employed in the process. Additional metal complexing agents include oxalic acid, lactic acid, gluconic acid, tartaric acid, citric acid, salicylic acid, 5-sulfosalicylic acid, disodium-1,2-dihydroxybenzene-3,5-disulfonate, 8-hydroxyquinoline-5-sulfonic acid, nitroacetic acid, pyrophosphoric acid, n-methylglycine, glycine, n-ethylglycine, n-propylglycine, n-butylglycine, n-isopropylglycine, alpha-alanine, beta-alanine, norvaline, leucine, phenylalanine, tyrosine, serine, threonine, 1-ornithine, aspharagine, lysine, arginine, proline, glutamic acid, glycylglycine, etc. Additional organic complexing agents are listed in the test "Organic Sequestering Agents" by Chaberek & Martell, John Wiley & Sons, Inc. (1959), pages 505–580.

The materials described to this point are satisfactory sweetening catalysts. The catalytic metal is firmly ionically bound to the base. The catalysts used in the process of the present invention are prepared by making the following modifications.

In the case of copper sulfide, a copper zeolite or resin as previously disclosed is contacted with a sulfiding material such as $H_2S$. In this manner a substantial proportion of the copper ion is converted to copper sulfide. $H_2S$ can be bubbled through the ionic catalyst or $H_2S$ can be dissolved in a solvent and the prior art catalyst soaked with the solution. Another method involves contacting the ionic catalyst with any suitable salt which supplies sulfide ions in solution. An alkali metal sulfide such as sodium sulfide or ammonium sulfide is dissolved in a solvent and the ionic catalyst is soaked with the solution at ambient temperature.

In the case of the hydroxide form, the copper-resin or copper-zeolite is contacted with a suitable hydroxide such as sodium hydroxide.

In the case of copper oxide, the catalyst containing the copper hydroxide is heated to convert the hydroxide to the oxide. Another method of preparing the oxide form of the catalyst comprises heating the ionic form of the catalyst in the presence of oxygen (i.e. air) at 300–850° F.

In the case of copper metal, the ionic form of the catalyst is contacted with a reducing agent such as sodium hydrosulfite. Another method is to heat the copper ion catalyst in the presence of a gaseous reducing agent such as $H_2$ gas at 375° F.

Catalysts containing lead sulfide, lead hydroxide, lead oxide and/or metallic lead are made in a similar manner by converting the lead ions after they have been placed on the support.

Applicants' catalysts provide the metal or the sulfide, oxide, or hydroxide form of the metal on very widely dispersed sites. There are substantially no crystals or agglomerates of metal or salt large enough to give a definite X-ray pattern. In this very finely divided form the catalyst is much more active than a catalyst prepared by impregnation or coprecipitation of metal salts on a base.

Suitable feedstocks comprise liquid hydrocarbons boiling in the range of from about 50 to about 600° F. The liquid hydrocarbons may be liquid alkanes, liquid alkenes, liquid aromatics such as benzene, toluene, and/or xylene, liquid cycloaliphatic hydrocarbons such as cyclohexane, and mixtures thereof. Petroleum hydrocarbon fractions boiling in the range of 50–500° F. are particularly suitable feedstocks. For example, petroleum fractions such as light virgin naphtha, heavy virgin naphtha, light catalytically cracked naphtha, heavy catalytically cracked naphtha, coker naphtha, steam cracked naphtha, gasoline, kerosene, jet fuels, fuel oils, and mixtures of these such as middle distillate fractions can be sweetened by the process of the invention.

The organic mercaptan impurity in the sour fraction has the formula of RSH where R is the hydrocarbon radical of the mercaptan. It may be a $C_1$ to $C_{20}$ alkyl or alkenyl group, an aromatic hydrocarbon group, such as phenyl or substituted phenyl or the like. The mercaptan is ordinarily present in a sour fraction in an amount ranging from 0.0001 to 1.0 wt. percent based on the feedstock.

A preferred method of practicing the process of the invention comprises contacting the sour petroleum hydrocarbon feedstock by percolation through a bed of the catalyst in the presence of excess air at temperatures ranging between 30 and 250° F. Preferably the temperature range varies between 50 and 200° F. The process operates in a pressure range of from about atmospheric to 500 p.s.i.g., preferably 10 to 200 p.s.i.g. With many feedstocks ambient temperature and pressure can be employed. Feed rates may be in the range from about 0.25 to 100 v./v./hr. with a preferred range of from about 1 to about 30 v./v./hr.

The following examples disclose preparation of the catalysts of the invention and comparative sweetening results.

EXAMPLE 1

A quantity of copper zeolite prepared by base exchanging the amorphous zeolite base Aridzone AAA with copper metal, i.e., ($Cu^{++}Z$) was air dried to a moisture content of 14%. Another quantity of the same material was oven dried at 230° F. to a moisture content of 1%. Portions of each were placed in glass tubes and then $H_2S$ was passed through to convert the copper ion to copper sulfide (CuSZ). The excess $H_2S$ was blown out with air.

EXAMPLE 2

2½ ml. of each catalyst was measured into a 120 milliliter oil sample bottle. Then 80 ml. of sour kerosene, containing 100 p.p.m. of mercaptan was added. The bottles were corked and then tumbled in a rotary mixer at a temperature of approximately 75° F. Samples were taken at ½-hour intervals, up to 1½ hours for mercaptan analysis. Shaking was continued overnight and the mercaptan content was again determined. The sweet kerosene was decanted and another 80 ml. of sour kerosene was added. The shaking and sampling procedures were then repeated. Comparative results of sweetening kerosene containing 100 p.p.m. mercaptan with $Cu^{++}Z$ and CuSZ are set forth below in Table 1.

TABLE 1

|  | RSH, p.p.m. as sulfur | | | |
| --- | --- | --- | --- | --- |
|  | ½ hour | 1 hour | 1½ hour | Overnight |
| First portion: | | | | |
| (1) $Cu^{++}Z$, air dried | 60 | 55 | 50 | 8 |
| (2) CuSZ, air dried | 50 | 33 | 14 | 2 |
| (3) $Cu^{++}Z$, oven dried | 61 | 45 | 31 | 0 |
| (4) CuSZ, oven dried | 58 | 35 | 18 | 0 |
| Second portion: | | | | |
| (1) $Cu^{++}Z$, air dried | 76 | 74 | 63 | 12 |
| (2) CuSZ, air dried | 55 | 37 | 27 | 1 |
| (3) $Cu^{++}Z$, oven dried | 70 | 63 | 54 | 22 |
| (4) CuSZ, oven dried | 64 | 38 | 19 | 0 |

It can be seen that the sulfided copper zeolite sweetens much faster than the original ionic copper zeolite. In addition the sulfided catalyst retains its high activity in the second test. Thus the sweetening reaction can be carried out at a much higher space velocity or alternatively a smaller reactor can be used. The graph shown in the drawing emphasizes the data of Table 1. Four curves are drawn in which mercaptan content is plotted against time. Catalysts which have been converted to the sulfide form are superior sweetening agents regardless of whether the catalyst starting material was air dried (14% moisture) or oven dried (1% moisture). It was thought that the presence of $H_2O$ in the base prior to sulfiding might block the pores however it was found that drying to a very low water content was not a requirement.

Satisfactory results will also be obtained with the oxide form, the hydroxide form and the zerovalent metal form of the catalyst.

We have found that lead salts deposited upon ion exchange resin and zeolite bases are also improved catalysts for sweetening hydrocarbons. The lead salts are converted from the ionic form in the same way as the copper salts and reference is made to the foregoing descriptions.

The following examples disclose the preparation and testing of lead sulfide on resin and zeolite ion exchange based.

EXAMPLE 3

Both the ionic lead and sulfided lead materials were AAA amorphous zeolite were each converted by exchange to the $Pb^{++}$ ion form and air-dried overnight. The converted resin was labeled $Pb^{++}R$ and the zeolite, $Pb^{++}Z$. A portion of each was treated with $H_2S$ gas to convert the lead ion to lead sulfide (PbSR and PbSZ). Two (2) methods then were used to remove the excess $H_2S$: (a) air blowing and (b) washing with isopropyl alcohol (IsOH). The washed sample then was drained, blotted, and left in the air several minutes until just free-flowing.

Both the ionic lead and sulfided lead material were tested for sweetening activity using the same shaking method and with the same sour kerosene (containing 100 p.p.m. RSH) previously used for the copper catalysts. For those catalysts showing activity, a second and third portion of sour kerosene were each added in sequence.

The results are shown below:

TABLE 2

|  | RSH, p.p.m. as sulfur | | | |
| --- | --- | --- | --- | --- |
|  | ½ hour | 1 hour | 1½ hour | Overnight |
| First portion: | | | | |
| (1) $Pb^{++}R$, air dried | 100 | 100 | 100 | [1] 95 |
| (2) PbSR, air blown | 91 | 74 | 64 | 5 |
| (3) PbSR, IsOH wash | 82 | 74 | 59 | 9 |
| (4) $Pb^{++}Z$, air dried | 100 | 100 | 100 | [1] 102 |
| (5) PbSZ, air blown | 32 | 13 | 6 | 0 |
| (6) PbSZ, IsOH wash | 27 | 10 | 5 | 0 |
| Second portion: | | | | |
| (2) PbSR, air blown | 92 | 69 | 53 | 5 |
| (3) PbSR, IsOH wash | 75 | 60 | 50 | 2 |
| (5) PbSZ, air blown | 73 | 55 | 41 | 10 |
| (6) PbSZ, IsOH wash | 59 | 42 | 36 | 5 |
| Third portion: | | | | |
| (2) PbSR, air blown | 87 | 66 | 63 |  |
| (3) PbSR, IsOH wash | 86 | 68 | 51 |  |
| (5) PbSZ, air blown | 63 | 64 | 44 |  |
| (6) PbSZ, IsOH wash | 57 | 48 | 24 |  |

[1] No activity; testing discontinued.

The ionically bound Pb++ material showed no activity; whereas, the sulfided material showed high activity. The activtity of the sulfided resin remained constant through the second and third portions. The activity of the sulfided zeolite was extremely high at first and decreased with the second portion of kerosene. However, its activity leveled out about equivalent to the sulfided copper zeolites in Example 1.

The process of the invention provides many advantages over previous sweetening processes. No chemical treating agent such as caustic is used which may contaminate the product or cause disposal problems. The active sweetening component is widely dispersed on the base material, and the catalyst may be used in continuous operations over very long periods of time without regeneration. Contrary to prior art disclosures indicating that sulfides are catalyst poisons we have found that sulfiding improves a sweetening catalyst rather than deactivating it.

In the sweetening of color sensitive feeds such as certain middle distillates, the catalysts of the present process cause much less color degradation than prior art catalysts. The lead sulfide catalyst is particularly effective in this respect.

What is claimed is:

1. A process for sweetening sour hydrocarbon feedstocks comprising contacting said feedstocks with an oxygen-containing gas at a temperature in the range of 30–250° F. in the presence of a catalyst prepared by base exchanging a metal selected from the group consisting of lead and copper with a base comprising an ion exchange composition selected from the group consisting of organic ion exchange resins, amorphous zeolites and crystalline zeolites, said base material having a high exchange capacity and a surface area of at least 1 sq. meter/gram and converting the ionic metal to a nonionic form comprising metal sulfide and recovering a sweetened hydrocarbon product.

2. A process according to claim 1 in which the catalyst is prepared by base exchanging copper with faujasite and thereafter converting the metal to the sulfide form.

3. Process according to claim 2 in which the copper is converted to the sulfide form by contacting with $H_2S$.

4. Process according to claim 1 in which the hydrocarbon feedstock is a petroleum fraction boiling in the range of 50–500° F.

5. Process according to claim 1 in which the hydrocarbon fraction is cracked naphtha.

6. Process according to claim 1 in which the hydrocarbon fraction is coker naphtha.

7. Process according to claim 1 in which the petroleum fraction is kerosene.

8. Process according to claim 1 in which the metal is lead.

9. Process according to claim 1 in which the said ionic metal is complexed with ammonia prior to said conversion to non-ionic form.

10. A process for sweetening sour hydrocarbon feedstocks comprising contacting said feedstocks at sweetening conditions in the presence of air and a sweetening catalyst prepared by base exchanging $Cu^{++}$ ions with a catalyst base comprising an ion exchange composition selected from the group consisting of organic ion exchange resins, amorphous zeolites and crystalline zeolites, and converting the ionic copper to a nonionic form selected from the group consisting of the sulfide form, the oxide form, the hydroxide form, and the metal form and recovering a sweetened hydrocarbon product.

References Cited

UNITED STATES PATENTS

| | | | |
|---|---|---|---|
| 3,051,646 | 8/1962 | Brooke | 208—193 |
| 3,378,484 | 4/1968 | Ferrara et al. | 208—191 |
| 3,392,111 | 7/1968 | Napier et al. | 208—197 |

DELBERT E. GANTZ, *Primary Examiner.*

G. J. CRACANAKIS, *Assistant Examiner.*

U.S. Cl. X.R.

208—197; 252—439, 454.